(12) United States Patent
De Dominico

(10) Patent No.: US 10,267,050 B2
(45) Date of Patent: **\*Apr. 23, 2019**

(54) FRAMELESS ACCESS PANEL

(71) Applicant: Fabio Giovanni De Dominico, Maple (CA)

(72) Inventor: Fabio Giovanni De Dominico, Maple (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,674

(22) Filed: Jun. 29, 2015

(65) Prior Publication Data

US 2015/0300062 A1    Oct. 22, 2015

Related U.S. Application Data

(63) Continuation-in-part of application No. 13/189,017, filed on Jul. 22, 2011, now Pat. No. 9,068,380.

(60) Provisional application No. 61/426,859, filed on Dec. 23, 2010.

(51) Int. Cl.
*E04F 19/08* (2006.01)
*E06B 9/00* (2006.01)
*E05C 1/04* (2006.01)
*H02G 3/14* (2006.01)

(52) U.S. Cl.
CPC .............. *E04F 19/083* (2013.01); *E05C 1/04* (2013.01); *E06B 9/00* (2013.01); *H02G 3/14* (2013.01); *E06B 2009/002* (2013.01)

(58) Field of Classification Search
CPC ................................ E04F 19/08; E04F 19/083
USPC .................................................. 49/463, 465
See application file for complete search history.

(56) References Cited

U.S. PATENT DOCUMENTS

| | | | | | |
|---|---|---|---|---|---|
| 1,905,082 | A | * | 4/1933 | Wuebling | E04F 19/08 49/246 |
| 2,766,856 | A | * | 10/1956 | Nelsson | E04F 19/08 16/257 |
| 3,270,462 | A | * | 9/1966 | Obadal | B62D 25/10 16/257 |
| 3,491,486 | A | * | 1/1970 | Caruth | E04F 19/08 174/66 |
| 3,537,212 | A | * | 11/1970 | Gilles | E04F 19/08 16/268 |
| 3,566,566 | A | * | 3/1971 | Janic | E04F 19/08 138/92 |

(Continued)

FOREIGN PATENT DOCUMENTS

| EP | 2014847 A1 | * | 1/2009 | .............. E04F 19/08 |
|---|---|---|---|---|
| SE | 465226 | * | 8/1991 | .............. E04F 19/08 |

*Primary Examiner* — Catherine A Kelly

(57) ABSTRACT

A frameless access panel comprises a panel member having an inner surface and an outer surface, at least one fixed projection mounted to the inner surface of the planar metal sheet and being spaced from a first edge of the panel member, at least one moveable member configured to slide along a respective track adjacent the inner surface between a first position and a second position, the first position being spaced from a second edge of the panel member, the second edge being opposite the first edge, and the second position being spaced further from the second edge than the first position, the moveable member comprising a tab extending outwardly therefrom, and a respective biasing member providing a force for biasing the at least one moveable member towards the first position. The frameless access panel is generally non-combustible.

18 Claims, 21 Drawing Sheets

(56) References Cited

U.S. PATENT DOCUMENTS

| | | | | |
|---|---|---|---|---|
| 3,724,150 A * | 4/1973 | Hudnall | ............... | E04F 19/08 |
| | | | | 174/486 |
| 4,738,054 A * | 4/1988 | Muth | ............... | E04B 9/003 |
| | | | | 49/386 |
| 4,913,127 A * | 4/1990 | Dugger | ............... | F24C 15/20 |
| | | | | 126/190 |
| 4,998,381 A * | 3/1991 | Langenhorst | ............... | E06B 5/16 |
| | | | | 49/463 |
| 5,327,682 A * | 7/1994 | Holtz | ............... | E04F 19/08 |
| | | | | 16/254 |
| 5,355,626 A * | 10/1994 | Sachs | ............... | H02G 3/185 |
| | | | | 49/380 |
| 5,669,190 A * | 9/1997 | Szyjkowski | ............... | E05B 65/006 |
| | | | | 411/551 |
| 5,765,312 A * | 6/1998 | Szyjkowski | ............... | E04F 19/083 |
| | | | | 49/463 |
| 5,950,616 A * | 9/1999 | Armentrout | ............... | F24H 3/087 |
| | | | | 126/106 |
| 6,557,956 B2 * | 5/2003 | Hightower | ............... | A47B 47/05 |
| | | | | 24/297 |
| 6,618,996 B1 * | 9/2003 | Szyjkowski | ............... | E04F 19/083 |
| | | | | 292/175 |
| 6,931,794 B1 * | 8/2005 | Burgess | ............... | E04F 13/06 |
| | | | | 174/50 |
| 7,067,023 B2 * | 6/2006 | Kami | ............... | C21D 8/0236 |
| | | | | 148/603 |
| 7,243,462 B2 * | 7/2007 | Langenhorst | ............... | E04F 19/083 |
| | | | | 292/303 |
| 7,617,641 B2 * | 11/2009 | Landey | ............... | E04B 5/02 |
| | | | | 52/177 |
| 8,745,926 B2 * | 6/2014 | De Domenico | ............... | E05B 35/008 |
| | | | | 49/465 |
| 9,068,380 B2 * | 6/2015 | De Domenico | ............... | E05C 1/04 |
| 2002/0184827 A1 * | 12/2002 | Duffy | ............... | E04F 19/08 |
| | | | | 49/463 |
| 2007/0196681 A1 * | 8/2007 | Biggs | ............... | B22F 7/004 |
| | | | | 428/550 |
| 2010/0050533 A1 * | 3/2010 | Klapishevskyy | ............... | E04F 19/083 |
| | | | | 49/400 |

\* cited by examiner

FRAMELESS ACCESS PANEL

CROSS-REFERENCE TO RELATED APPLICATIONS

This application is a continuation-in-part of U.S. patent application Ser. No. 13/189,017 filed on Jul. 22, 2011, which claims the benefit of U.S. Provisional Application No. 61/426,859 filed on Dec. 23, 2010, the contents of which are incorporated herein by reference in their entireties.

FIELD OF THE INVENTION

The present invention relates generally to access panels and in particular, to a frameless access panel.

BACKGROUND OF THE INVENTION

Access panels are used in the housing and construction industries for providing removable covers of utilities located behind structural surfaces, such as walls and ceilings. The utility may be a plumbing fixture, such as for example a valve on a water line or a meter on a gas line, or an electrical fixture, such as for example an electrical switch or circuit breaker. The access panel is removable for providing access to the utility.

Frameless access panels are designed to grip an inside surface of an opening within a wall or ceiling, without requiring a separate frame to be mounted within the opening. Several frameless access panels have been previously disclosed. For example, U.S. Pat. No. 4,970,836 to Brown is directed to a closure device for an access opening having a face plate attractively complementing a surface in which the opening occurs.

U.S. Pat. No. 5,765,312 to Szyjkowski is directed to an access panel for installation over an opening in paneling of a wall or ceiling.

U.S. Pat. No. 6,618,996 to Szyjkowski is directed to an access panel for covering an aperture in a structure.

U.S. Pat. No. 6,931,794 to Burgess is directed to a framing device or support member for framing a fitting.

U.S. Design Pat. No. D611,170 to Hiner is directed to a design of an access panel.

Swedish Patent No. 465,226 to Wahlberg is directed to an inspection hatch comprising a cover panel intended, when positioned, to cover an opening in a so-called pipe shaft.

Improvements of frameless access panels are generally desired. It is therefore an object of the present invention to provide a novel frameless access panel.

SUMMARY OF THE INVENTION

Accordingly, in one aspect there is provided a frameless access panel comprising: a panel member comprising a single planar metal sheet having an inner surface and an outer surface and being sized to cover an opening; at least one fixed projection mounted to the inner surface of the planar metal sheet and being spaced from a first edge of the panel member; at least one non-combustible, metal moveable member configured to slide along a respective track adjacent the inner surface of the planar metal sheet between a first position and a second position, the first position being spaced from a second edge of the panel member, the second edge being opposite the first edge, and the second position being spaced further from the second edge than the first position, the moveable member comprising a tab extending outwardly therefrom; and a respective biasing member providing a force for biasing the at least one moveable member towards the first position, the frameless access panel being generally non-combustible.

The at least one fixed projection may comprise a pin. The pin may be curved so as to provide a curved gripping surface. The pin may have a tab fastened to an end thereof.

The at least one fixed projection may comprise two fixed projections. Each fixed projection may comprise a base mounted to the panel member, and a tab extending from the base.

The at least one fixed projection may be fabricated of a material selected from the group consisting of metal sheet, perforated sheet metal, wire mesh, metal grating sheet, and expanded metal sheet. The at least one fixed projection may comprise a generally rigid shaped wire.

BRIEF DESCRIPTION OF THE DRAWINGS

Embodiments will now be described more fully with reference to the accompanying drawings in which.

DETAILED DESCRIPTION OF THE EMBODIMENTS

Figure 1:
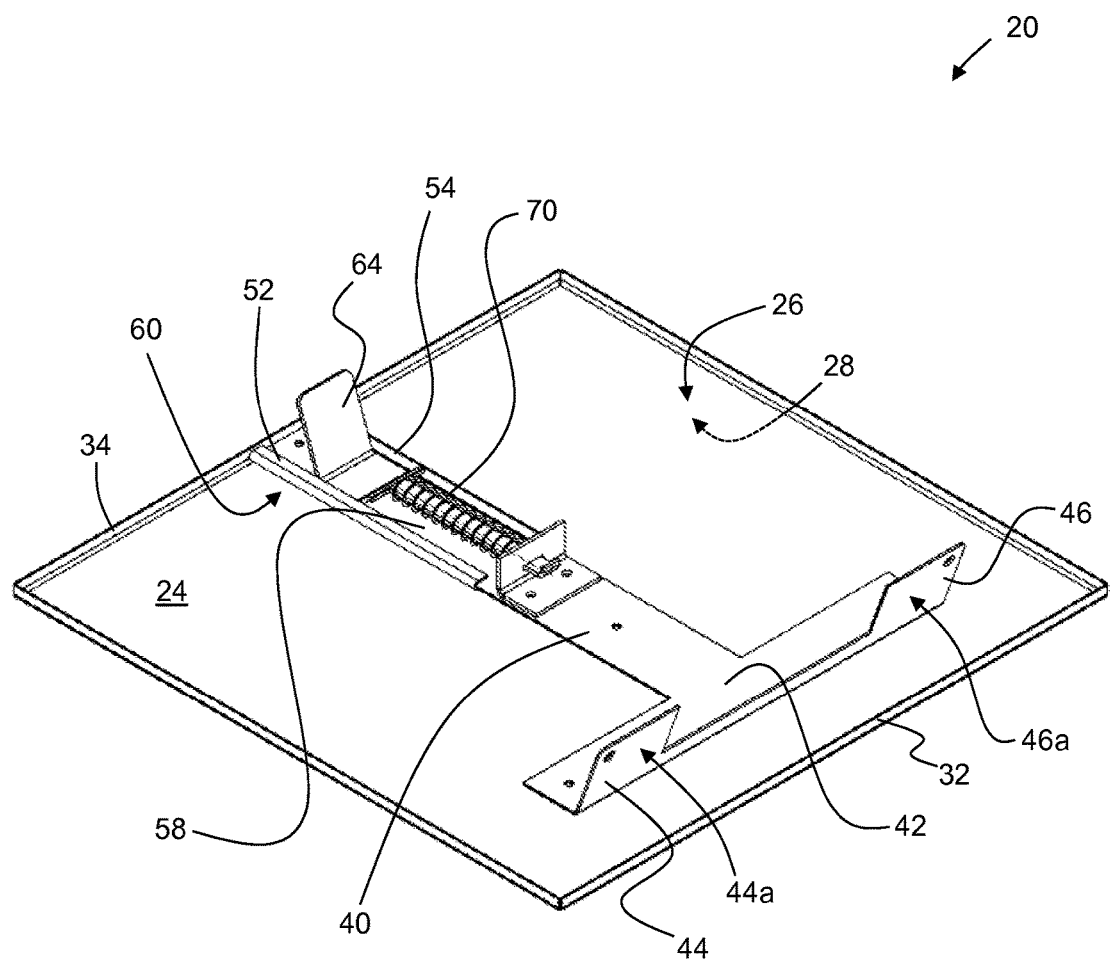
FIG. 1 is a perspective view of a frameless access panel.
Figure 2:
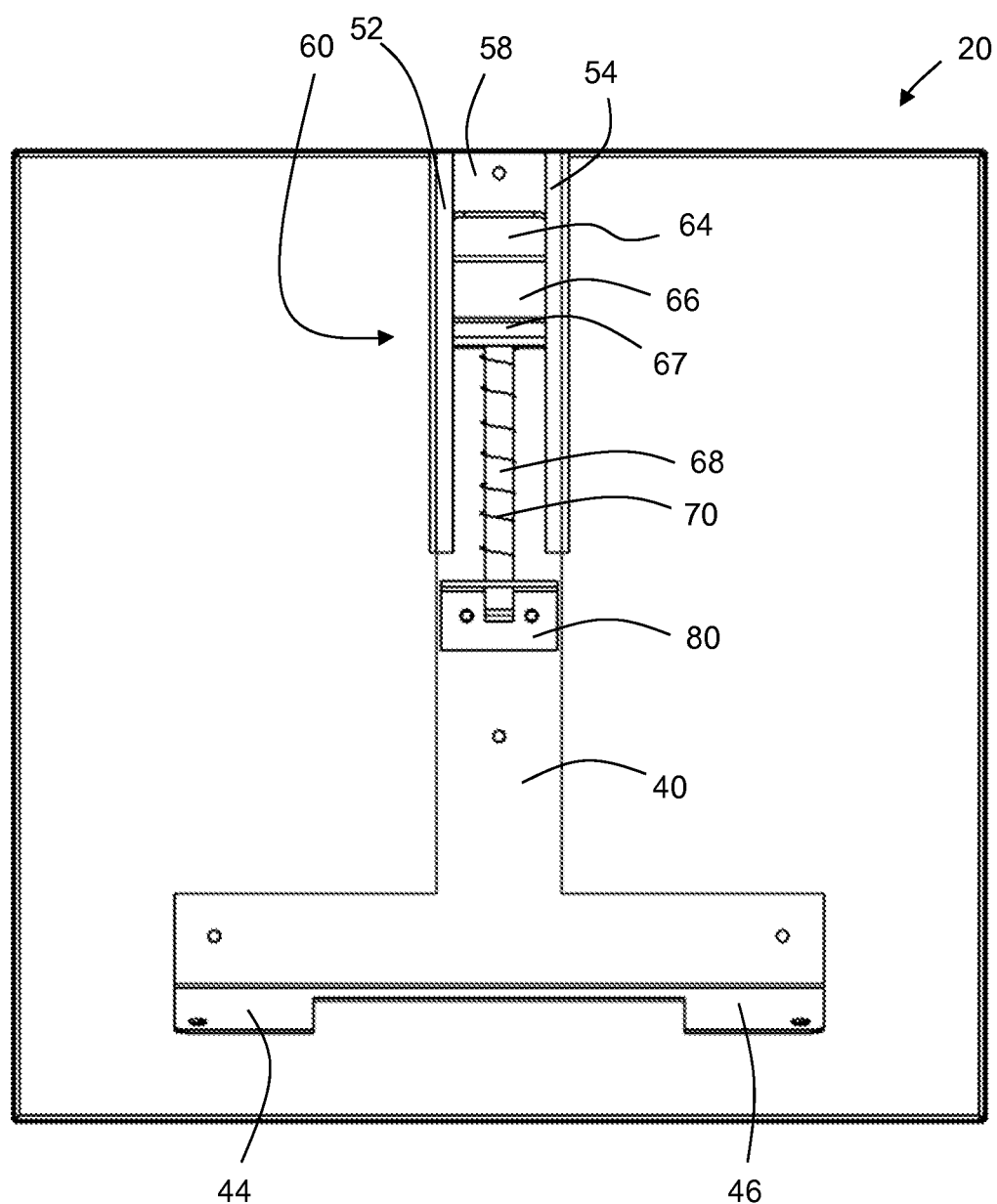
FIG. 2 is a plan view of the frameless access panel of FIG. 1, showing an inner side.
Figure 3:
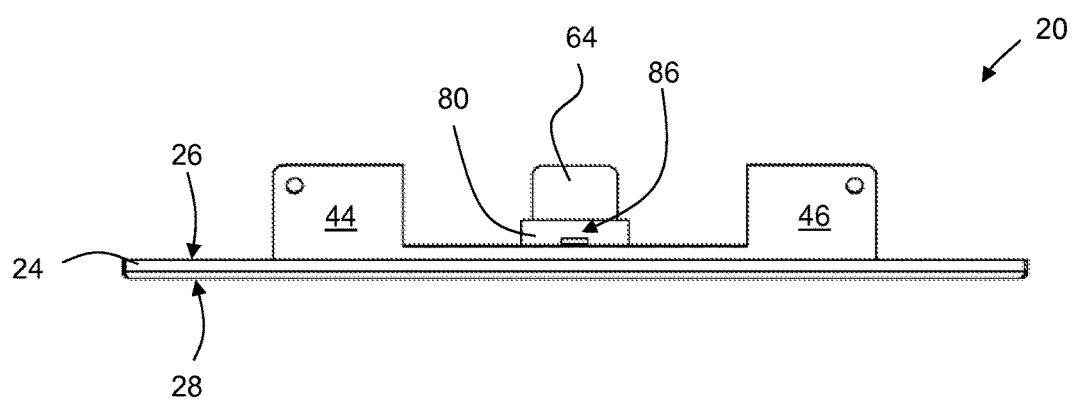
FIG. 3 is a front elevation view of the frameless access panel of FIG. 1.
Figure 4:
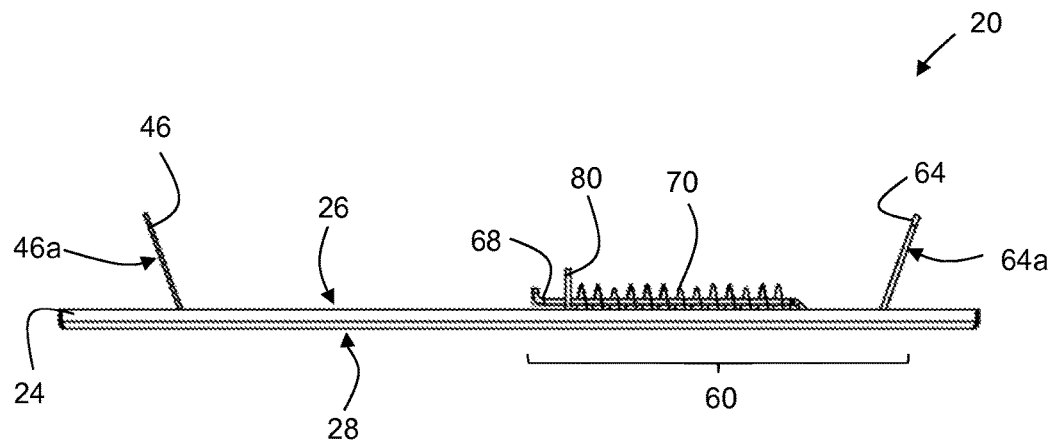
FIG. 4 is a side elevation view of the frameless access panel of FIG. 1.
Figure 5:
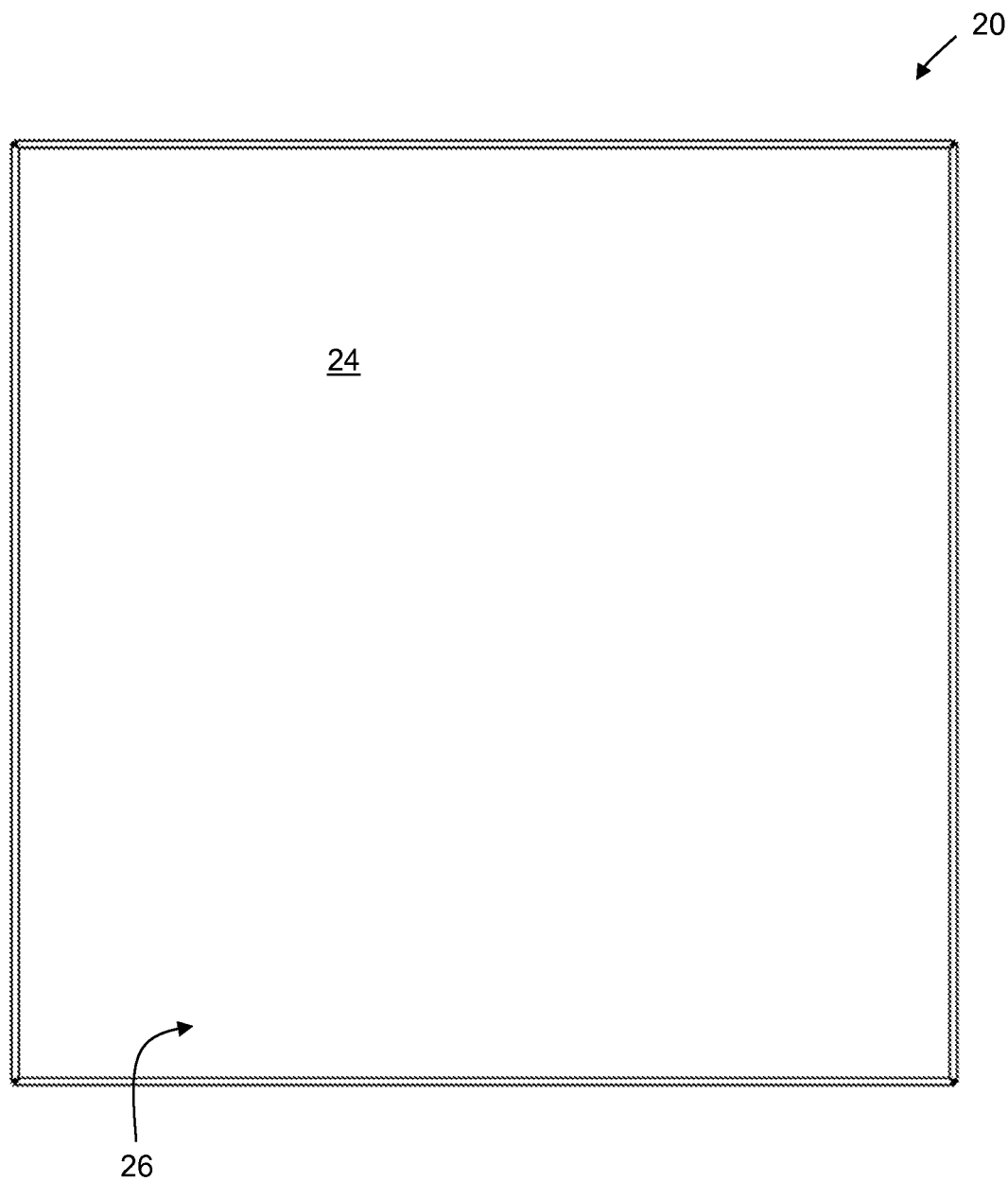
FIG. 5 is another plan view of the frameless access panel of FIG. 1, showing an outer side.

The following is directed to a frameless access panel that is generally non-combustible. The frameless access panel may be used for covering an aperture in a surface such as, for example, an opening in a wall, a ceiling or a floor.

As will be appreciated, the non-combustible feature of the frameless access panel advantageously allows the panel to be used in buildings located within jurisdictions in which existing or future building codes require building materials to be generally non-combustible. For example, Section 9.10.17.1 of the 2005 National Building Code of Canada requires that room lining materials used in residential construction have a Flame Spread Rating (FSR) value that does not exceed 150. Similarly, Sections 3.1.12 and 3.1.13 of the 2006 Ontario Building Code require that the interior wall finishes and interior ceiling finishes have an FSR value that does not exceed 75 for non-sprinklered buildings, or 150 for sprinklered buildings. Building codes having generally similar flame spread requirements are also currently in force in other jurisdictions, including the United States.

As is known in the art, FSR is generally related to the propensity of a material to burn rapidly and to spread flames. As will be understood, materials considered to be non-combustible such as, for example, metals and metal sheet of the kinds used in building structures, typically have a much lower FSR value as compared to other materials, such as wood and plastics. For this reason, metal and metal sheet are referred to herein as being "generally non-combustible", while wood and plastics are considered to be "generally combustible".

Turning now to FIGS. 1 to 5, a frameless access panel is shown and is generally indicated using reference numeral 20. Access panel 20 is configured to serve as a removable cover for an opening in a structural surface. In this embodiment, the access panel 20 serves as a removable cover for an opening in a wall fabricated of drywall paneling. Access panel 20 comprises a panel member 24, and in the embodiment shown, panel member 24 is generally square in shape. Panel member 24 has an inner surface 26 and an outer surface 28. Panel member 24 is bounded by a perimeter having a first edge 32 and a second edge 34, with the second edge 34 being opposite the first edge 32. In this embodiment, the panel member 24 is fabricated from metal sheet, and namely galvannealed steel sheet which is known by the trade name Satincoat™ or Satin Coat™.

The access panel 20 also comprises a mounting member 40 fastened to the inner surface 26 of the panel member 24. In this embodiment, mounting member 40 is fastened to the panel member 24 by spot welds. Mounting member 40 has a first end 42 generally proximate first edge 32 of panel member 24, and comprises two fixed tabs 44 and 46 extending outwardly from the first end 42 of the mounting member 40. Each of the fixed tabs 44 and 46 has a respective gripping surface 44a and 46a for gripping a side of the opening in the wall during use. In the embodiment shown, fixed tabs 44 and 46 are angled such that gripping surfaces 44a and 46a each form an acute angle with the inner surface 26 of the panel member 24. Mounting member 40 has a second end generally proximate second edge 34 of the panel member 24, and comprising a pair of angled flanges 52 and 54 that define a track 58. In this embodiment, the mounting member 40, including fixed tabs 44 and 46 and flanges 52 and 54, is fabricated from metal sheet, and namely galvannealed steel sheet which is known by the trade name Satincoat™ or Satin Coat™.

The access panel 20 also comprises a moveable member 60. Moveable member 60 comprises a tab 64 extending outwardly therefrom. Tab 64 has a gripping surface 64a for gripping a side of the opening during use. In the embodiment shown, the tab 64 is angled such that gripping surface 64a forms an acute angle with the inner surface 26 of the panel member 24. Moveable member 60 also comprises a guide portion 66 that is shaped to be retained on track 58 by flanges 52 and 54, and further comprises a lip 67 extending generally upwardly from the guide portion 66. Moveable member 60 further comprises a tongue 68 that projects from the lip 67 in a direction parallel to the track 58. In this embodiment, the moveable member 60, including tab 64, guide portion 66, lip 67, and tongue 68, is fabricated from metal sheet, and namely galvannealed steel sheet which is known by the trade name Satincoat™ or Satin Coat™.

Moveable member 60 is configured to move slideably along the track 58 between a first position and a second position. Here, the first position is generally proximate, but spaced from, the second edge 34 of panel member 24, while the second position is generally distal from, and therefore spaced further from, the second edge 34 of panel member 24.

The access panel 20 also comprises a biasing member for providing a biasing force that biases the moveable member 60 towards the first position. In this embodiment, the biasing member is a coil spring 70 that is positioned to abut against the moveable member 60 and against a stop bracket 80 fastened to the mounting member 40. In this embodiment, stop bracket 80 is fastened to the mounting member 40 by spot welds. Coil spring 70 is supported by the tongue 68 that projects from the moveable member 60, and which extends through a corresponding aperture 86 in the stop bracket 80. In this embodiment, stop bracket 80 is fabricated from metal sheet, and namely galvannealed steel sheet which is known by the trade name Satincoat™ or Satin Coat™. Coil spring 70 is also fabricated from metal, and in this embodiment coil spring 70 is fabricated from stainless steel. Therefore, in this embodiment, all components of access panel 20 are fabricated of generally non-combustible materials. As will be appreciated, this advantageously enables the access panel 20 to be generally non-combustible.

Additionally, in this embodiment, as all components of access panel 20 are fabricated from metal sheet or metal, access panel 20 is also able to retain its structural integrity at relatively high temperatures. For example, most steels have a melting point of about 1050° C. or higher. In comparison, the melting points of polymers commonly used for structural and building applications are much lower than that of steel. For example, the melting point of polystyrene (PS) generally ranges from about 240° C. to about 270° C.; the melting point of polyvinyl chloride (PVC) generally ranges from about 100° C. to about 260° C.; and the melting point of polypropylene (PP) generally ranges from about 130° C. to about 170° C. As will be appreciated, by fabricating all of the components from steel, the access panel 20 advantageously has a generally high temperature resistance as compared to frameless access panels fabricated from materials having lower melting points.

Figure 6:
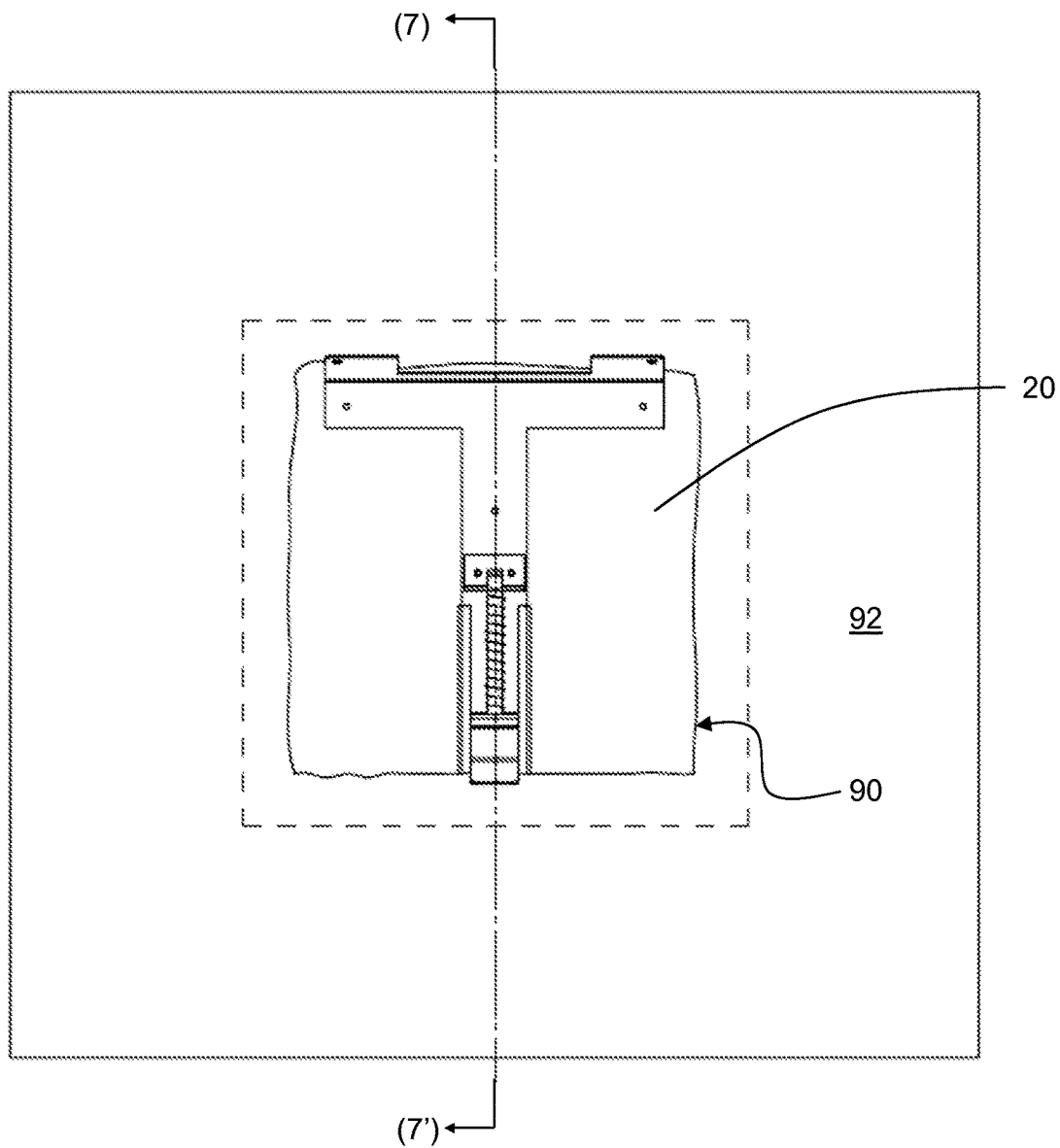
FIG. 6 is a view of the frameless access panel of FIG. 1 installed into a wall opening during use.
Figure 7:
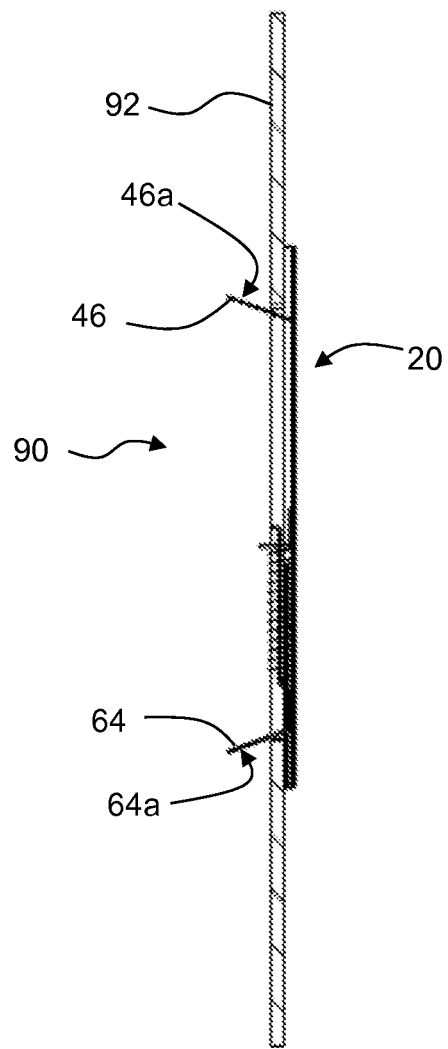
FIG. 7 is a side cross-sectional view of the frameless access panel of FIG. 1 installed into the wall opening of FIG. 6, taken along the indicated section line.
Figure 8:
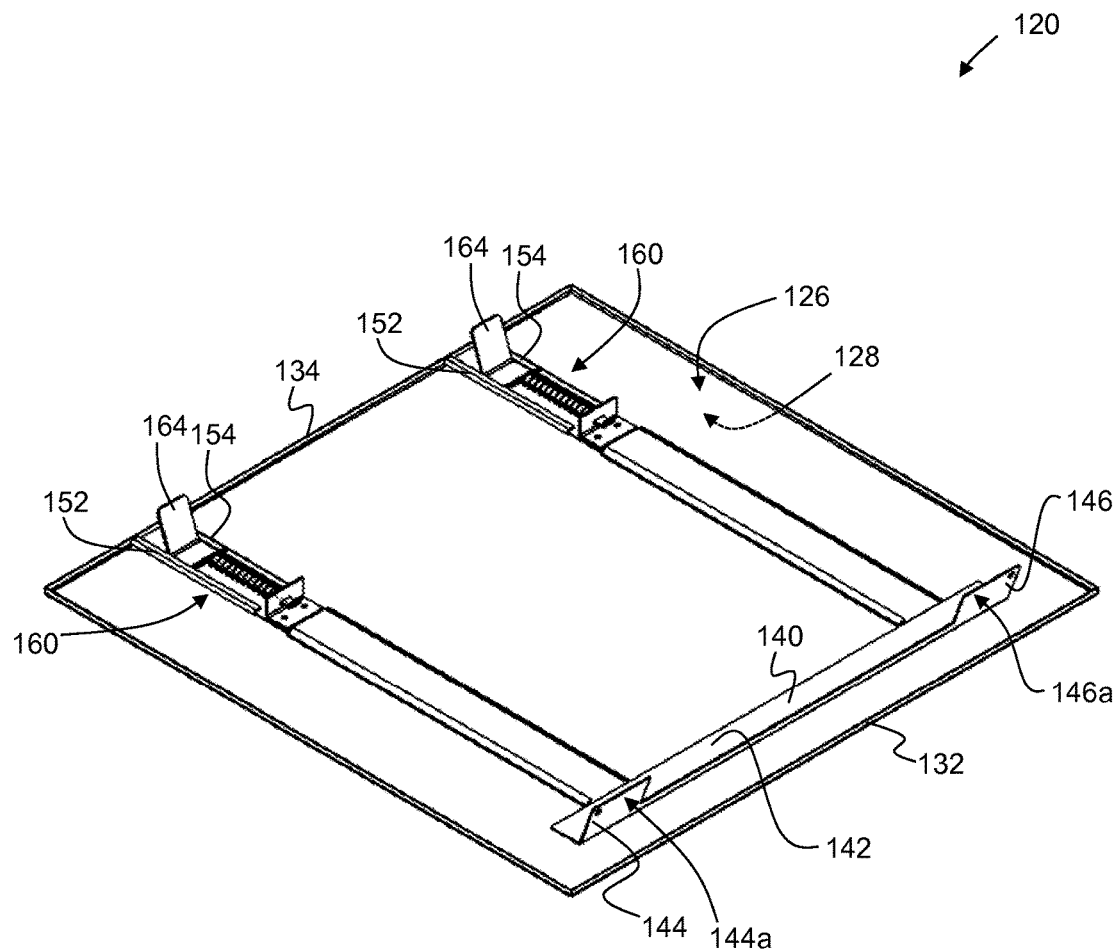
FIG. 8 is a perspective view of another embodiment of a frameless access panel.
Figure 9:
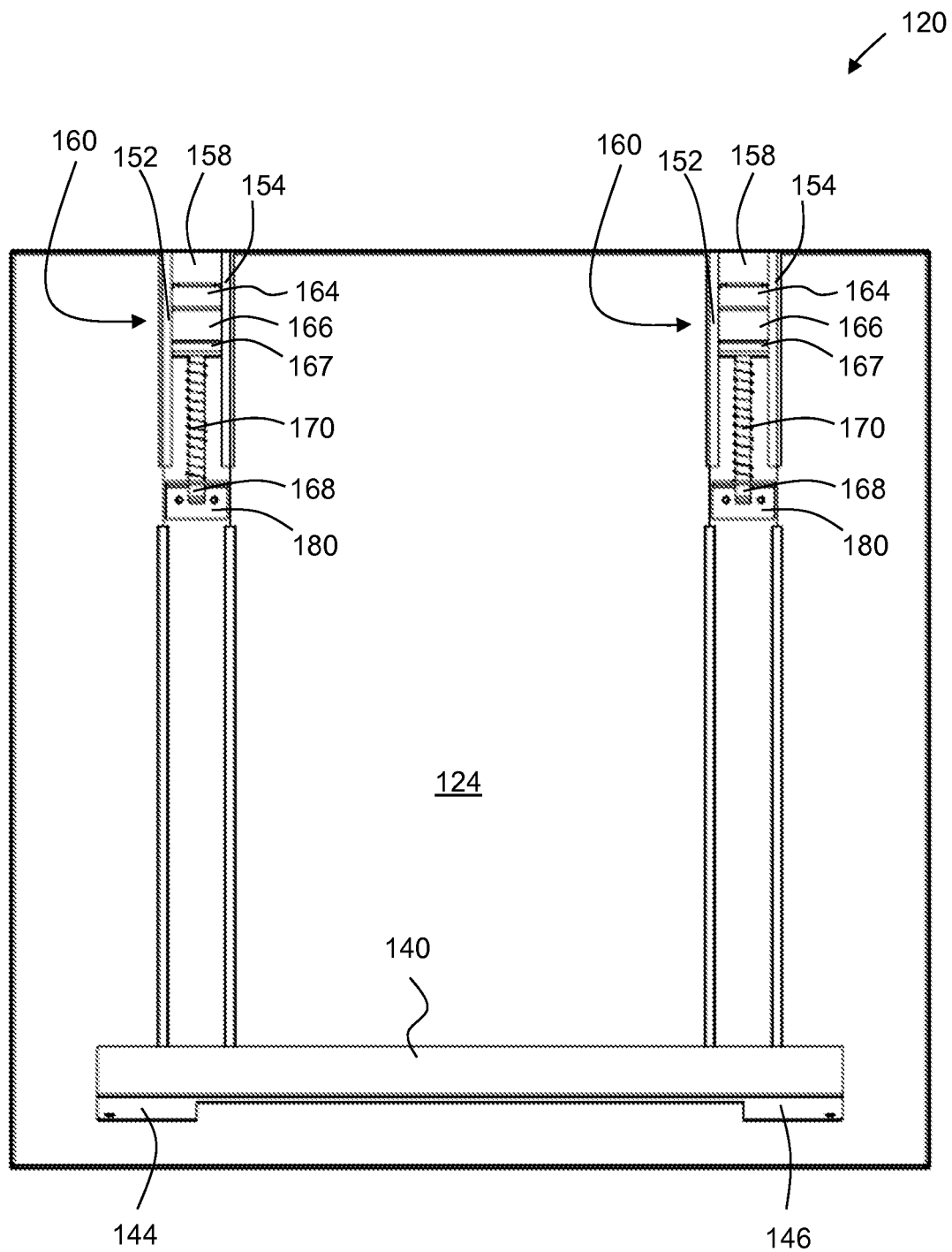
FIG. 9 is a plan view of the frameless access panel of FIG. 8, showing an inner side.
Figure 10:
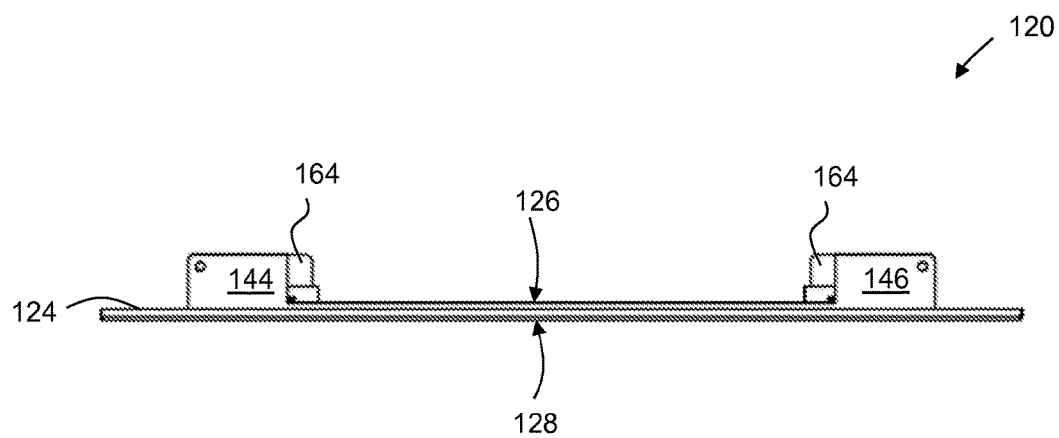
FIG. 10 is a front elevation view of the frameless access panel of FIG. 8.
Figure 11:
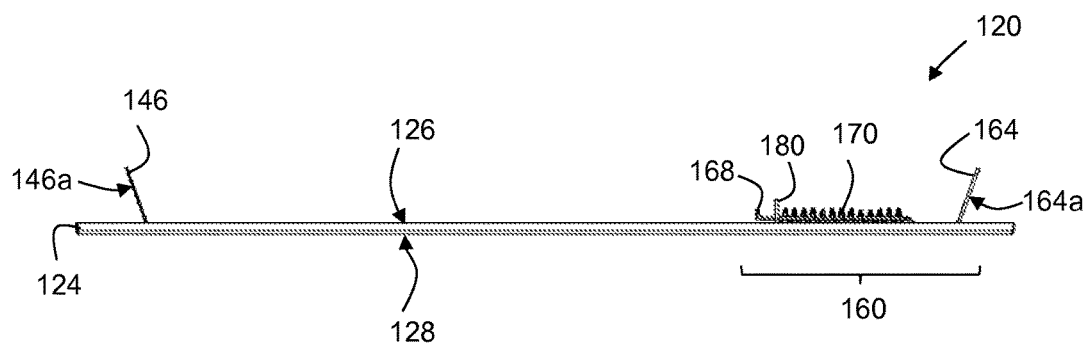
FIG. 11 is a side elevation view of the frameless access panel of FIG. 8.
Figure 12:
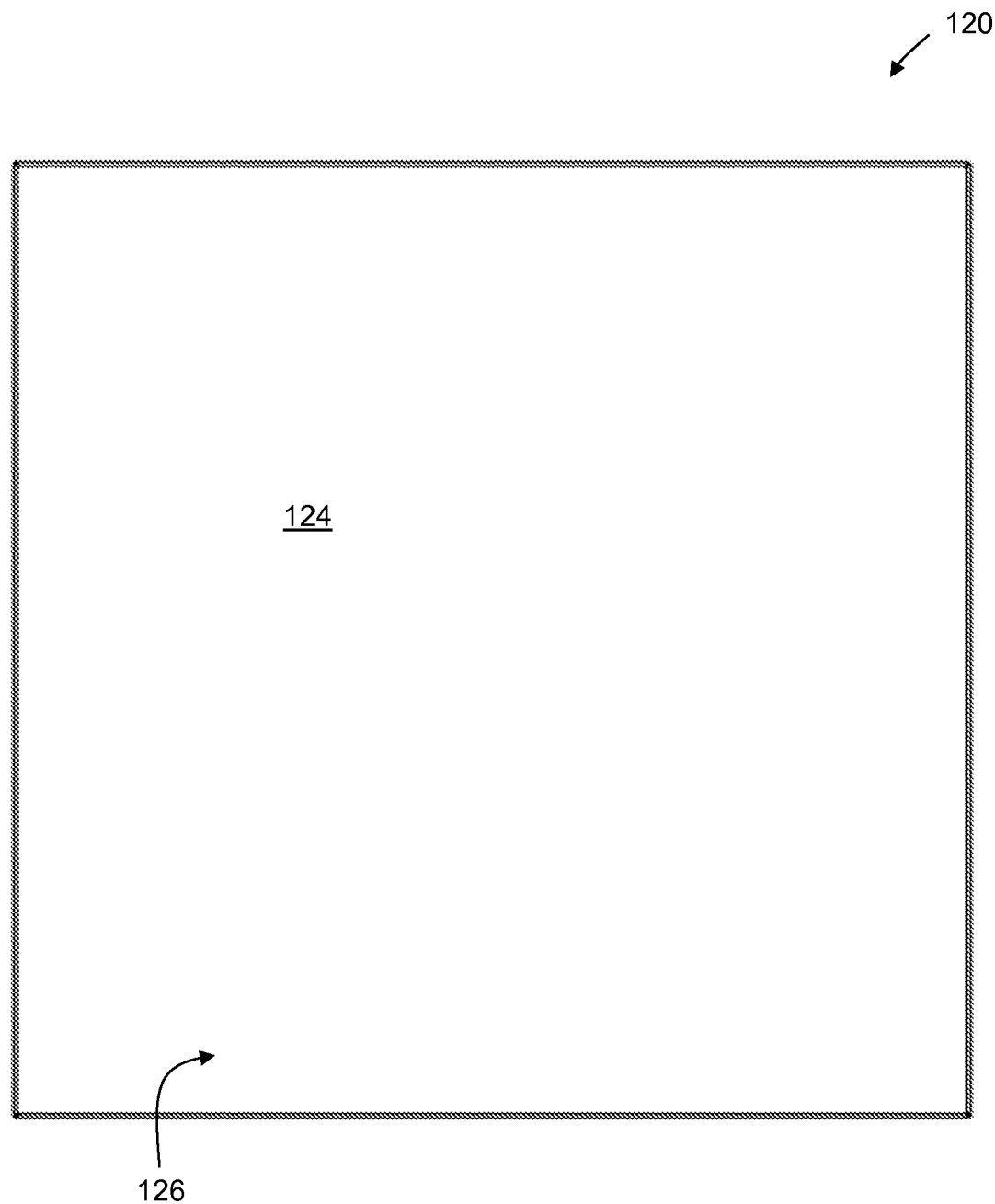
FIG. 12 is another plan view of the frameless access panel of FIG. 8, showing an outer side.

In use, access panel 20 may be installed into an opening 90 of a wall 92 by orienting the access panel 20 such that inner surface 26 faces the wall 92. The second edge 34 of the panel member 24 of the access panel 20 may then be brought towards an edge of the opening 90 such that the moveable member 60 engages a side of the opening 90, and so as to move the moveable member 60 from the first position towards the second position and against the biasing force provided by the biasing member. The first edge 32 of the panel member 24 may then be pivoted towards an edge of the opening 90 such that the fixed tabs 44 and 46 enter into the opening 90, and so as to bring the perimeter of the panel member 24 into contact with the surface of the wall 92. Once in this position, the biasing force provided by the biasing member moves the moveable member 60 from the second position generally towards the first position, such that the access panel 20 shifts in position until the gripping surfaces 44a and 46a of fixed tabs 44 and 46 engage a side of the opening 90. Once gripping surfaces 44a, 46a and 64a engage the sides of the opening 90, the access panel 20 is in an installed position, illustrated in FIGS. 6 and 7.

The access panel 20 may be removed from the installed position in generally a reverse sequence as that used for installation. Here, the access panel 20 may be shifted in a direction generally parallel to the wall surface so as to move the moveable member 60 towards the second position, and against the biasing force provided by the biasing member. The first edge 32 of the panel member 24 may then be pivoted away from the wall 92 such that the fixed tabs 44 and 46 clear the side of the opening 90. The second edge 34 of the panel member 24 may then be pulled generally away from the wall 92, so as to remove the access panel 20 from the opening 90.

FIGS. 8 to 12 show another embodiment of a frameless access panel, which is generally indicated using reference numeral 120. Access panel 120 is generally similar to access panel 20 described above and with reference to FIGS. 1 to 7, however access panel 120 comprises two moveable members each having a respective biasing member. As the total biasing force provided by the two biasing members is greater than the force provided by the single biasing member of access panel 20, access panel 120 may advantageously be of greater size or greater weight, or both, as compared to access panel 20. Accordingly, and as will be appreciated by those of skill in the art, the number moveable members used in the frameless access panel may be varied, depending on any of the weight and the size of the access panel.

Access panel 120 comprises a panel member 124, and in the embodiment shown, panel member 124 is generally square in shape. Panel member 124 has an inner surface 126 and an outer surface 128. Panel member 124 is bounded by a perimeter having a first edge 132 and a second edge 134, with the second edge 134 being opposite the first edge 132. In this embodiment, the panel member 124 is fabricated from metal sheet, and namely galvannealed steel sheet which is known by the trade name Satincoat™ or Satin Coat™.

The access panel 120 also comprises a mounting member 140 fastened to the inner surface 126 of the panel member 124. In this embodiment, mounting member 140 is fastened to the panel member 124 by spot welds. Mounting member 140 has a first end 142 generally proximate first edge 132 of panel member 124, and comprises two fixed tabs 144 and 146 extending outwardly from the first end 142 of the mounting member 140. Each of the fixed tabs 144 and 146 has a respective gripping surface 144a and 146a for gripping a side of the opening in the wall during use. In the embodiment shown, fixed tabs 144 and 146 are angled such that gripping surfaces 144a and 146a each form an acute angle with the inner surface 126 of the panel member 124. Mounting member 140 has second ends generally proximate second edge 134 of the panel member 124, and with each second end comprising a pair of angled flanges 152 and 154, with each pair defining a respective track 158. In this embodiment, the mounting member 140, including fixed tabs 144 and 146 and flanges 152 and 154, is fabricated from metal sheet, and namely galvannealed steel sheet which is known by the trade name Satincoat™ or Satin Coat™.

The access panel 120 also comprises two moveable members 160. Each moveable member 160 comprises a tab 164 extending outwardly therefrom. Each tab 164 has a gripping surface 164a that grips a side of the opening during use. In the embodiment shown, each tab 164 is angled such that gripping surface 164a forms an acute angle with the inner surface 126 of the panel member 124. Each moveable member 160 also comprises a guide portion 166 that is shaped to be retained on the respective track 158 by flanges 152 and 154, and further comprises a lip 167 extending generally upwardly from the guide portion 166. Each moveable member 160 further comprises a tongue 168 that projects from the lip 167 in a direction parallel to the track 158. In this embodiment, each of the moveable members 160, including tab 164, guide portion 166, lip 167, and tongue 168, is fabricated from metal sheet, and namely galvannealed steel sheet which is known by the trade name Satincoat™ or Satin Coat™.

Each moveable member 160 is configured to move slideably along its respective track 158 between a first position and a second position. Here, the first position is generally proximate, but spaced from, the second edge 134 of panel member 124, while the second position is generally distal from, and therefore spaced further from, the second edge 134 of panel member 124.

The access panel 120 also comprises two biasing members, each for providing a biasing force that biases a respective moveable member 160 towards the first position. In this embodiment, each biasing member is a coil spring 170 that is positioned to abut against the respective moveable member 160 and against a respective stop bracket 180 fastened to the mounting member 140. In this embodiment, stop bracket 180 is fastened to the mounting member 140 by spot welds. Coil spring 170 is supported by the tongue 168 that projects from the moveable member 160 and which extends through a corresponding aperture 186 in the stop bracket 180. In this embodiment, stop bracket 180 is fabricated from metal sheet, and namely galvannealed steel sheet which is known by the trade name Satincoat™ or Satin Coat™. Coil spring 170 is also fabricated from metal. Therefore, in this embodiment, all of the components of access panel 120 are fabricated of generally non-combustible materials. As will be appreciated, this advantageously enables the access panel 120 to be generally non-combustible.

Figure 13:
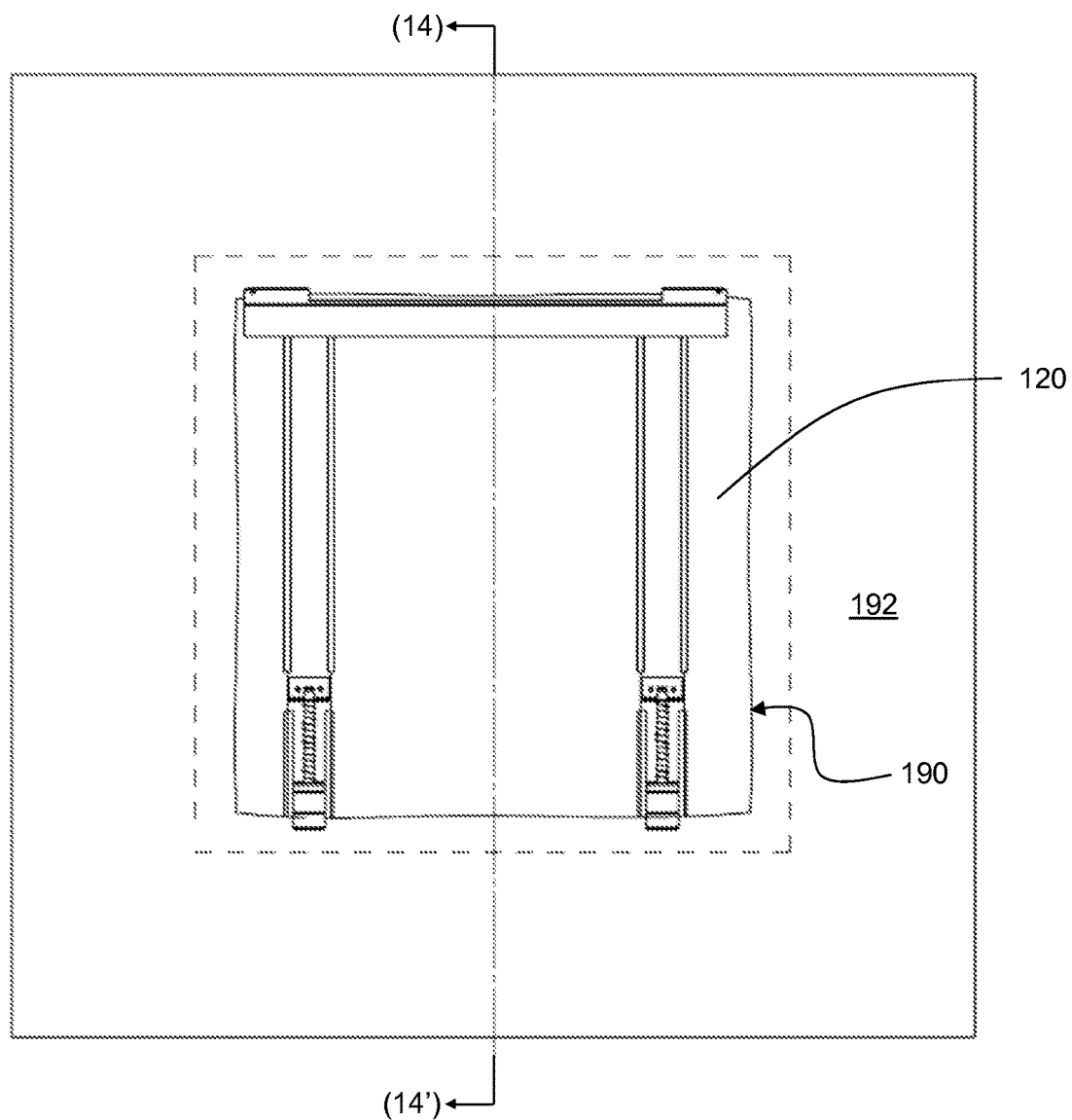
FIG. 13 is a view of the frameless access panel of FIG. 8 installed into a wall opening during use.
Figure 14:
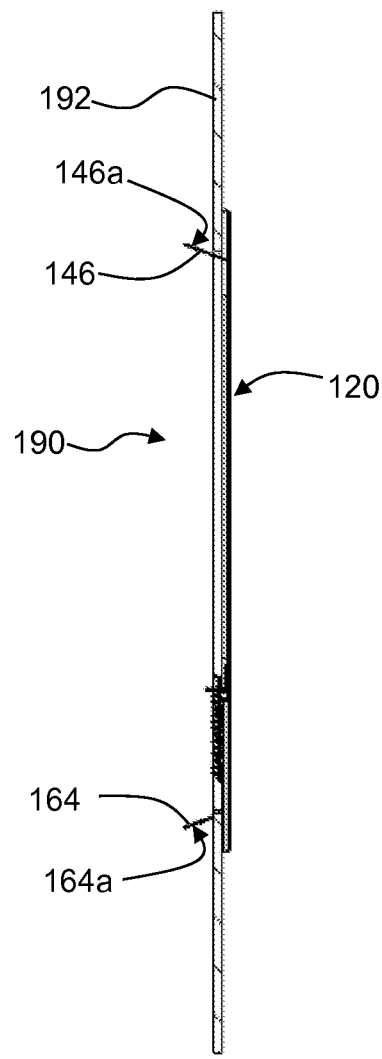
FIG. 14 is a side cross-sectional view of the frameless access panel of FIG. 8 installed into the wall opening of FIG. 13, taken along the indicated section line.

In use, access panel 120 may be installed into an opening 190 of a wall 192 in a manner that is generally similar as that described above for access panel 20, so as to bring the access panel 120 into an installed position, illustrated in FIGS. 13 and 14. The access panel 120 may be removed from the installed position by pulling the access panel 120 in a direction generally away from the wall 192, in a manner that is generally similar as that described above for access panel 20.

Figure 15:
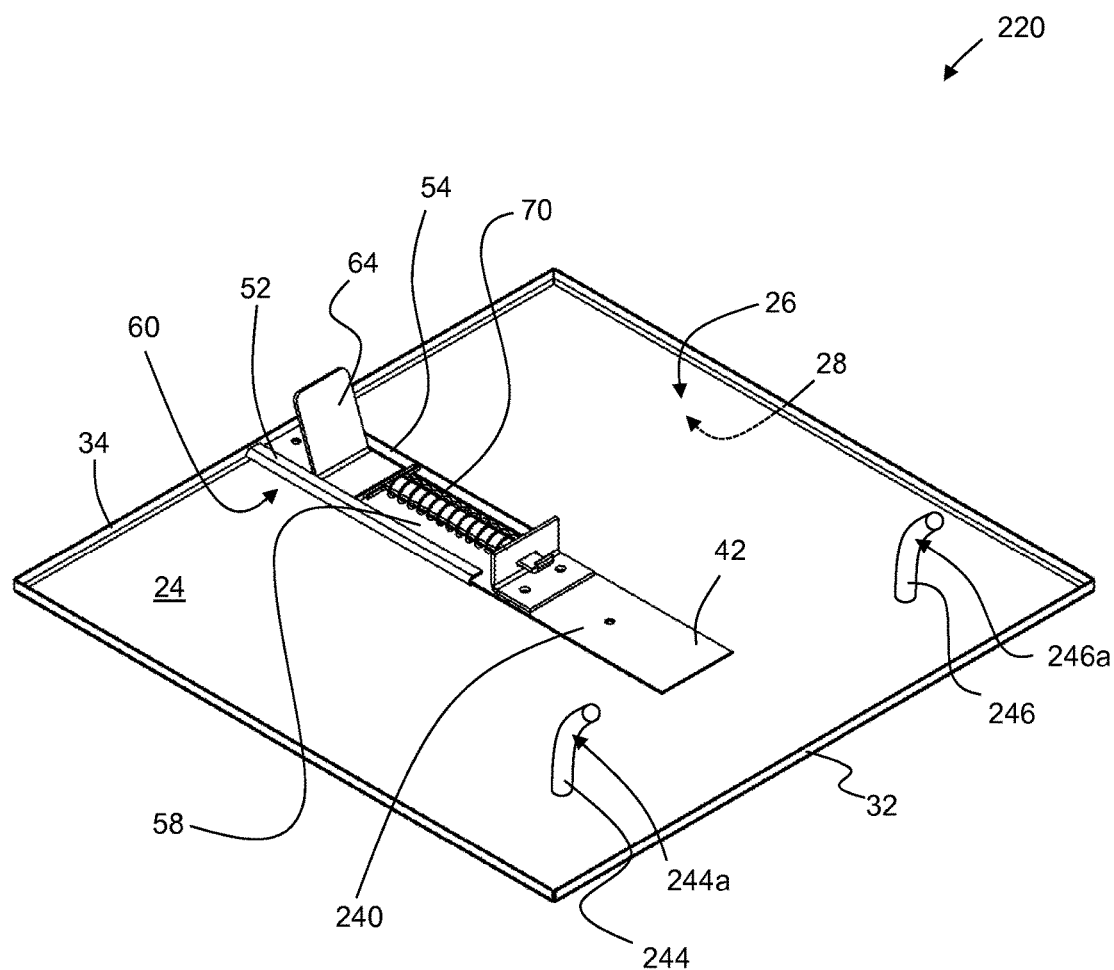
FIGS. 15, 15A, 15B, 15C, 15D and 15E are perspective views each showing another embodiment of a frameless access panel.

In other embodiments, the mounting member may be differently configured. For example, FIG. 15 shows another embodiment of a frameless access panel, which is generally indicated using reference numeral 220. Access panel 220 is generally similar to access panel 20 described above and with reference to FIGS. 1 to 7, however access panel 220 comprises a mounting member 240 that has a first end 42 and a second end, with the second end being generally proximate second edge 34 of the panel member 24, and comprising a pair of angled flanges 52 and 54 that define a track 58. In this embodiment, the mounting member 240, including flanges 52 and 54, is fabricated from metal sheet, and namely galvannealed steel sheet which is known by the trade name Satincoat™ or Satin Coat™.

Access panel 220 further comprises two fixed projections 244 and 246 extending outwardly from the panel member 24 generally proximate the first edge 32. In the embodiment shown, the fixed projections 244 and 246 are in the form of curved metal pins or "hooks" that are fastened to the panel member 24 using an insertion press, such as for example a PEMSERTER™ press manufactured by PennEngineering of Danbury, Pa., U.S.A. Each of the fixed projections 244 and 246 has a respective gripping surface 244a and 246a for gripping a side of the opening in the wall during use.

In use, access panel 220 may be installed into an opening of a wall in a manner that is generally similar as that described above for access panel 20, and may be removed from the installed position in a manner that is generally similar as that described above for access panel 20.

Figure 15A:
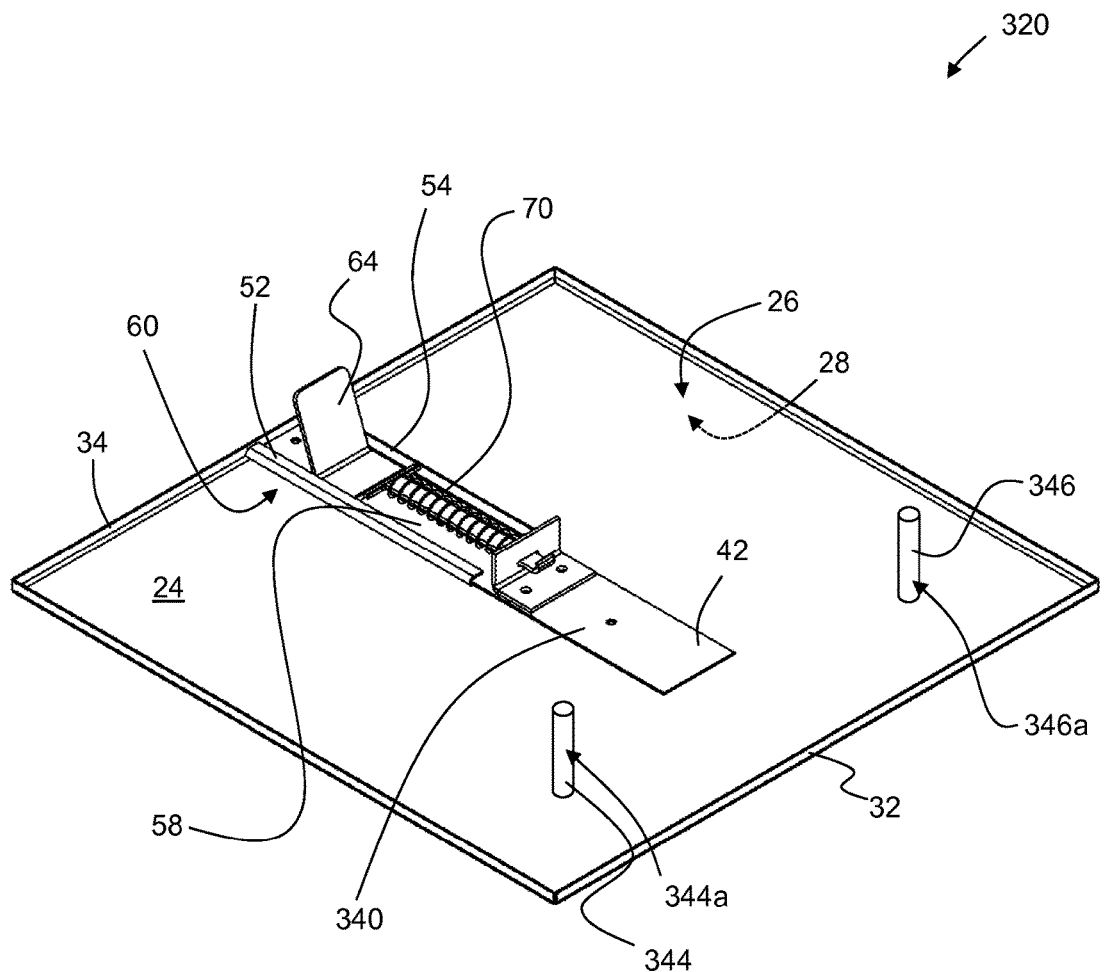

The projections may be differently configured. For example, For example, FIG. 15A shows another embodiment of a frameless access panel, which is generally indicated using reference numeral 320. Access panel 320 is generally similar to access panel 20 described above and with reference to FIGS. 1 to 7, however access panel 320 comprises a mounting member 340 that has a first end 42 and a second end, with the second end being generally proximate second edge 34 of the panel member 24, and comprising a pair of angled flanges 52 and 54 that define a track 58. In this embodiment, the mounting member 340, including flanges 52 and 54, is fabricated from metal sheet, and namely galvannealed steel sheet which is known by the trade name Satincoat™ or Satin Coat™.

Access panel 320 further comprises two fixed projections 344 and 346 extending outwardly from the panel member 24 generally proximate the first edge 32. In the embodiment shown, the fixed projections 344 and 346 are in the form of generally straight metal pins that are fastened to the panel member 24 using an insertion press, such as for example a PEMSERTER™ press manufactured by PennEngineering of Danbury, Pa., U.S.A. Each of the fixed projections 344 and 346 has a respective gripping surface 344a and 346a for gripping a side of the opening in the wall during use.

In use, access panel 320 may be installed into an opening of a wall in a manner that is generally similar as that described above for access panel 20, and may be removed from the installed position in a manner that is generally similar as that described above for access panel 20.

Figure 15B:
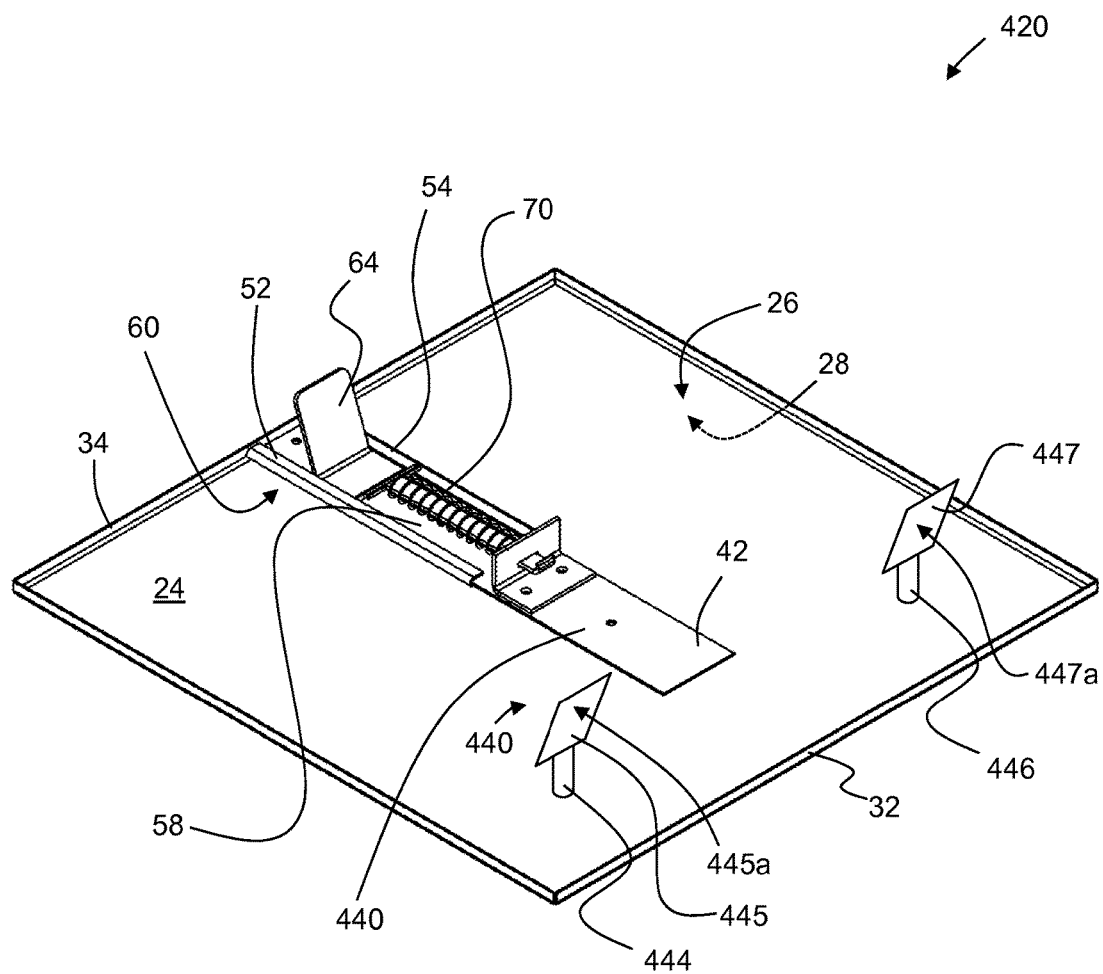

FIG. 15B shows another embodiment of a frameless access panel, which is generally indicated using reference numeral 420. Access panel 420 is generally similar to access panel 20 described above and with reference to FIGS. 1 to 7, however access panel 420 comprises a mounting member 440 that has a first end 42 and a second end, with the second end being generally proximate second edge 34 of the panel member 24, and comprising a pair of angled flanges 52 and 54 that define a track 58. In this embodiment, the mounting member 440, including flanges 52 and 54, is fabricated from metal sheet, and namely galvannealed steel sheet which is known by the trade name Satincoat™ or Satin Coat™.

Access panel 420 further comprises two fixed projections 444 and 446 extending outwardly from the panel member 24 generally proximate the first edge 32. Each of the fixed projections 444 and 446 comprises a metal pin having a respective tab 445 or 447, respectively, fastened to an end thereof. In the embodiment shown, the metal pins of the fixed projections 444 and 446 are fastened to the panel member 24 using an insertion press, such as for example a PEMSERTER™ press manufactured by PennEngineering of Danbury, Pa., U.S.A. Each of the tabs 445 and 447 has a respective gripping surface 444a and 446a for gripping a side of the opening in the wall during use. In the embodiment shown, the tabs are angled such that gripping surfaces 444a and 446a each form an acute angle with the inner surface 26 of the panel member 24.

In use, access panel 420 may be installed into an opening of a wall in a manner that is generally similar as that described above for access panel 20, and may be removed from the installed position in a manner that is generally similar as that described above for access panel 20.

The pins of the embodiments described above may alternatively be differently configured, for example as studs or standoffs, or may alternatively be screws or bolts, and/or may alternatively be fastened to the panel member using other presses, or by using one or more other tools, or in still other ways. As will be understood, such hardware may be fastened to the panel member using an automated hardware insertion press, or may alternatively be manually fastened to the panel member.

Figure 15C:
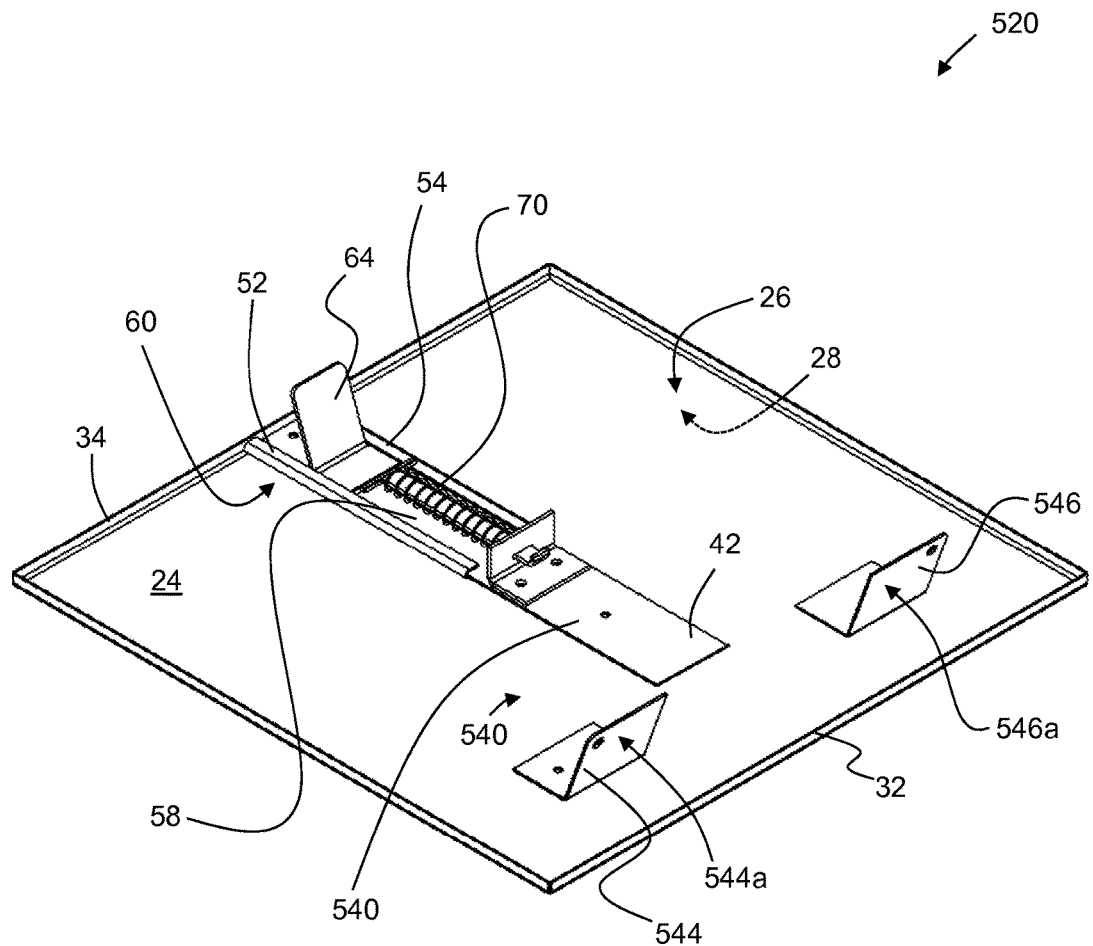

FIG. 15C shows another embodiment of a frameless access panel, which is generally indicated using reference numeral 520. Access panel 520 is generally similar to access panel 20 described above and with reference to FIGS. 1 to 7, however access panel 520 comprises a mounting member 540 that has a first end 42 and a second end, with the second end being generally proximate second edge 34 of the panel member 24, and comprising a pair of angled flanges 52 and 54 that define a track 58. In this embodiment, the mounting member 540, including flanges 52 and 54, is fabricated from metal sheet, and namely galvannealed steel sheet which is known by the trade name Satincoat™ or Satin Coat™.

Access panel 520 further comprises two fixed projections 544 and 546 extending outwardly from the panel member 24 generally proximate the first edge 32. Each of the fixed projections 544 and 546 comprises a metal sheet base fastened to the panel member 24 by spot welds, and a fixed tab extending outwardly from the base. Each of the tabs has a respective gripping surface 544a and 546a for gripping a side of the opening in the wall during use. In the embodiment shown, the fixed tabs are angled such that gripping surfaces 544a and 546a each form an acute angle with the inner surface 26 of the panel member 24. In this embodiment, the fixed projections 544 and 546 are fabricated from metal sheet, and namely galvannealed steel sheet which is known by the trade name Satincoat™ or Satin Coat™, but may alternatively be fabricated from any of perforated sheet metal, wire mesh, metal grating sheet, expanded metal sheet, and the like.

In use, access panel 520 may be installed into an opening of a wall in a manner that is generally similar as that described above for access panel 20, and may be removed from the installed position in a manner that is generally similar as that described above for access panel 20.

Figure 15D:
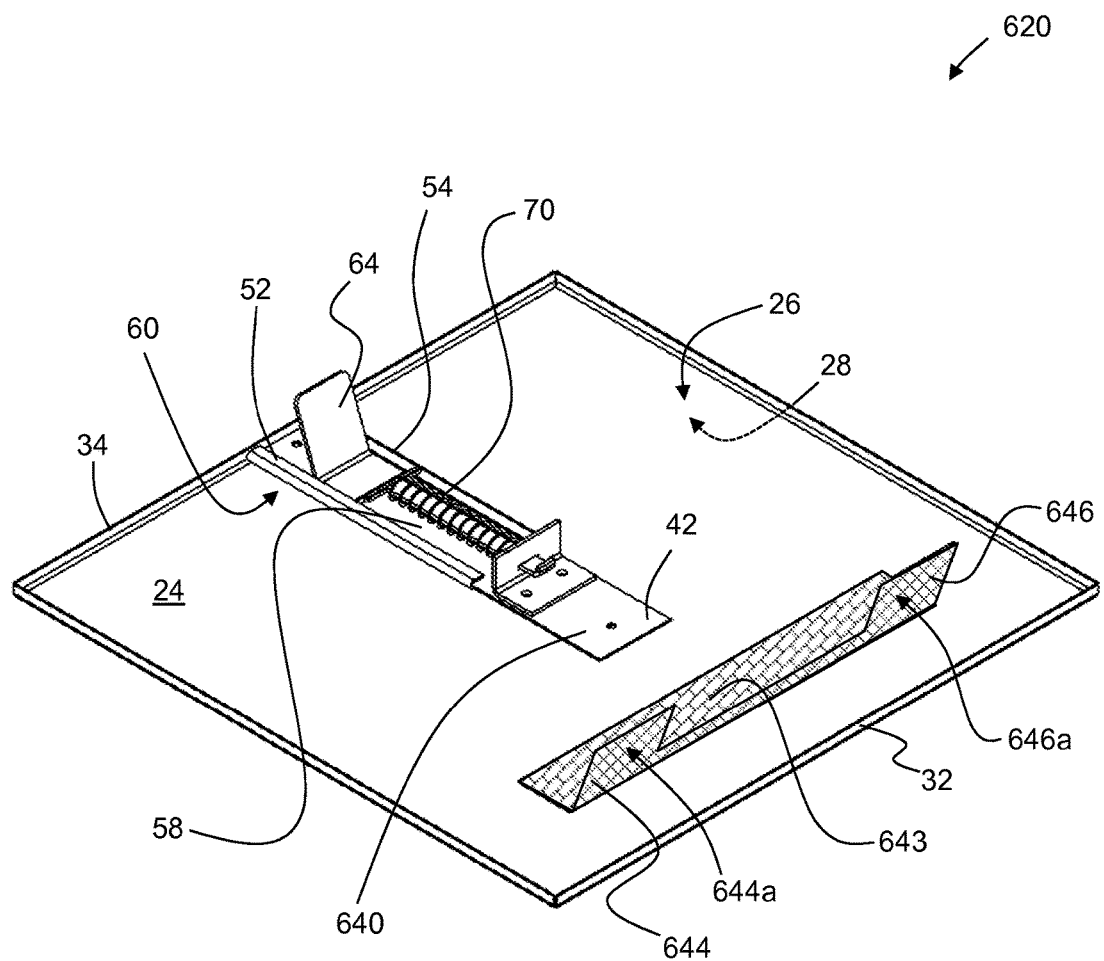

Still other configurations are possible. For example, FIG. 15D shows another embodiment of a frameless access panel, which is generally indicated using reference numeral 620. Access panel 620 is generally similar to access panel 20 described above and with reference to FIGS. 1 to 7, however access panel 620 comprises a mounting member 640 that has a first end 42 and a second end, with the second end being generally proximate second edge 34 of the panel member 24, and comprising a pair of angled flanges 52 and 54 that define a track 58. In this embodiment, the mounting member 640, including flanges 52 and 54, is fabricated from metal sheet, and namely galvannealed steel sheet which is known by the trade name Satincoat™ or Satin Coat™.

Access panel 620 further comprises a fixed projection 643 extending outwardly from the panel member 24 generally proximate the first edge 32. The fixed projection 643 comprises a base fastened to the panel member 24 by spot welds, and two fixed tabs 644 and 646 extending outwardly from the base. Each of the tabs 644 and 646 has a respective gripping surface 644a and 646a for gripping a side of the opening in the wall during use. In the embodiment shown, the fixed tabs 644 and 646 are angled such that gripping surfaces 644a and 646a each form an acute angle with the inner surface 26 of the panel member 24. In this embodiment, the fixed projection 643 is fabricated from perforated sheet metal, but may alternatively be fabricated of any of wire mesh, metal grating sheet, expanded metal sheet, and the like.

In use, access panel 620 may be installed into an opening of a wall in a manner that is generally similar as that described above for access panel 20, and may be removed from the installed position in a manner that is generally similar as that described above for access panel 20.

Figure 15E:
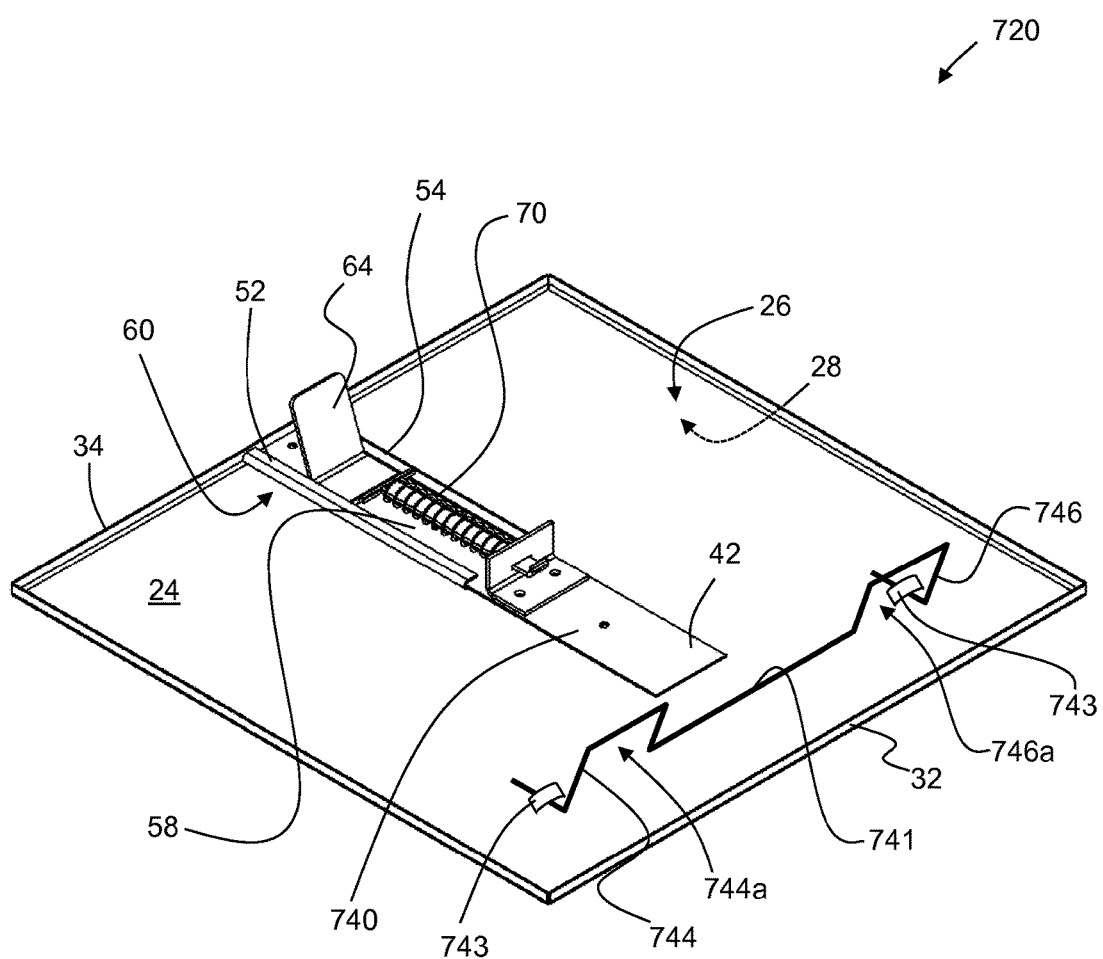

FIG. 15E shows another embodiment of a frameless access panel, which is generally indicated using reference numeral 720. Access panel 720 is generally similar to access panel 20 described above and with reference to FIGS. 1 to 7, however access panel 720 comprises a mounting member 740 that has a first end 42 and a second end, with the second end being generally proximate second edge 34 of the panel member 24, and comprising a pair of angled flanges 52 and 54 that define a track 58. In this embodiment, the mounting member 740, including flanges 52 and 54, is fabricated from metal sheet, and namely galvannealed steel sheet which is known by the trade name Satincoat™ or Satin Coat™.

Access panel 720 further comprises a fixed projection 741 extending outwardly from the panel member 24 generally proximate the first edge 32. In this embodiment, the fixed projection 741 comprises a generally rigid shaped wire fastened to the panel member 24 by a plurality of clamps 743 that are spot welded to the panel member 24. The shaped wire is shaped to so as define the partial perimeters of two tabs 744 and 746 extending outwardly from the panel member 24. Each of the tabs 744 and 746 provides a respective gripping surface 744a and 746a for gripping a side of the opening in the wall during use. In the embodiment shown, the fixed tabs 744 and 746 are angled such that gripping surfaces 744a and 746a each form an acute angle with the inner surface 26 of the panel member 24.

In use, access panel 720 may be installed into an opening of a wall in a manner that is generally similar as that described above for access panel 20, and may be removed from the installed position in a manner that is generally similar as that described above for access panel 20.

In embodiments, typical values of Flame Spread Rating (FSR) and Smoke Developed Classification (SDC) for the access panel, as defined by the Standard CAN/ULC-S102-10, *Standard Method of Test for Surface Burning Characteristics of Building Materials and Assemblies*, range from 0 to about 30. In further embodiments, typical values of FSR and SDC for the access panel range from about 10 to about 20. Similarly, in specific embodiments regarding the panel member, typical values of FSR and SDC range from 0 to about 30. In further embodiments, typical values of FSR and SDC for the panel member range from about 10 to about 20.

Although in embodiments described above, components of the frameless access panel are fabricated from metal sheet, wherein the metal sheet is galvannealed steel sheet, in other embodiments, components of the frameless access panel or metal may alternatively be fabricated from any other metal or metal alloy sheet that is non-combustible such as, for example, non-galvannealed steel sheet, stainless steel sheet, and aluminum sheet.

Although in embodiments described above, the components of the frameless access panel are fabricated from metal sheet and metal, in other embodiments, the components of the frameless access panel may alternatively be fabricated from one or more other materials that are generally non-combustible.

Although in embodiments described above, all of the components of the frameless access panel are fabricated from materials that are generally non-combustible, in other embodiments, only some of the components of the access panel may alternatively be fabricated from materials that are generally non-combustible, provided the frameless access panel is generally non-combustible.

Although in embodiments described above, the panel member is generally square in shape, in other embodiments, the panel member may alternatively be any one of, for example, rectangular, circular and oval in shape. In still other embodiments, the panel member may alternatively be any shape.

Although in embodiments described above, the frameless access panel comprises a biasing member that is a coil spring, in other embodiments, the biasing member may alternatively be any one of, for example, a tension coil spring, a torsion spring, a cantilever spring, and an elastic band. In still other embodiments, the biasing member may alternatively be any form of spring.

Although in embodiments described above, the frameless access panel comprises a mounting member having two (2) fixed tabs, in other embodiments, the mounting member may alternatively comprise any number of fixed tabs, including one (1), three (3), or more. In still other embodiments, the access panel may alternatively comprise no mounting member, and may instead comprise only moveable members.

Although in embodiments described above, the frameless access panel comprises one (1) or two (2) moveable members, in other embodiments, the access panel may comprise any number of moveable members, including three (3) or more.

Although in embodiments described above, the frameless access panel serves as a removable cover for an opening in a wall fabricated of drywall paneling, in other embodiments, the frameless access panel may alternatively serve as a removable cover for an opening in a wall fabricated of any material of suitable thickness. In a related embodiment, the suitable thickness may be from about ½" (0.5 inches) to about ⅝" (0.625 inches). In still other embodiments, the frameless access panel may alternatively serve as a removable cover for an opening in any structural surface.

Although in embodiments described above, components are fastened to the panel member by spot welds, in other embodiments, one or more components may alternatively be fastened to the panel member in any manner known in the art, such as for example by using fasteners, such as any of, for example, screws, rivets and bolts, or by using fastener hardware configured for fastening using a hardware insertion press.

Although in embodiments described above, components are fastened to the panel member by spot welds, in other embodiments, one or more components may alternatively be fastened to the panel member by other types of welds, such as for example by TIG welds, MIG welds, and the like.

The following example illustrates various features of the above-described apparatus.

Example 1

In this example, panel members 24 were subjected to surface burning characteristics tests conducted in accordance with the Standard CAN/ULC-S102-10, *Standard Method of Test for Surface Burning Characteristics of Building Materials and Assemblies*. Each panel member 24 measured 521 mm wide×521 mm long, and was fabricated from galvannealed steel sheet. Fourteen (14) panel members were laid end to end to achieve a required sample length.

A summary of test results is shown in Table 1.

TABLE 1

| Test Sample | Sample Description | Calculated Flame Spread Value (FSV) | Calculated Smoke Developed Value (SDV) |
|---|---|---|---|
| A | panel members | 14.3 | 13.8 |
| B | panel members | 16.8 | 15.7 |
| C | panel members | 14.3 | 19.1 |

Figure 16:
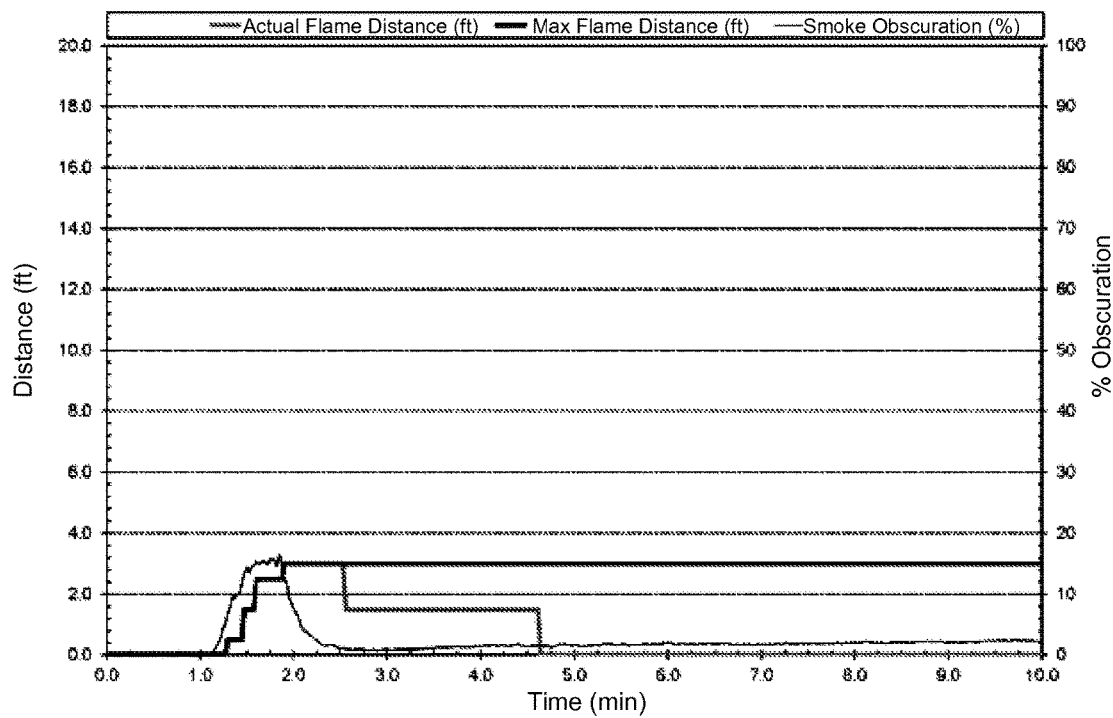
FIG. 16 is a graphical plot showing results of surface burning characteristics tests conducted on a first plurality of panel members, each panel member forming part of the access panel of FIG. 1.
Figure 17:
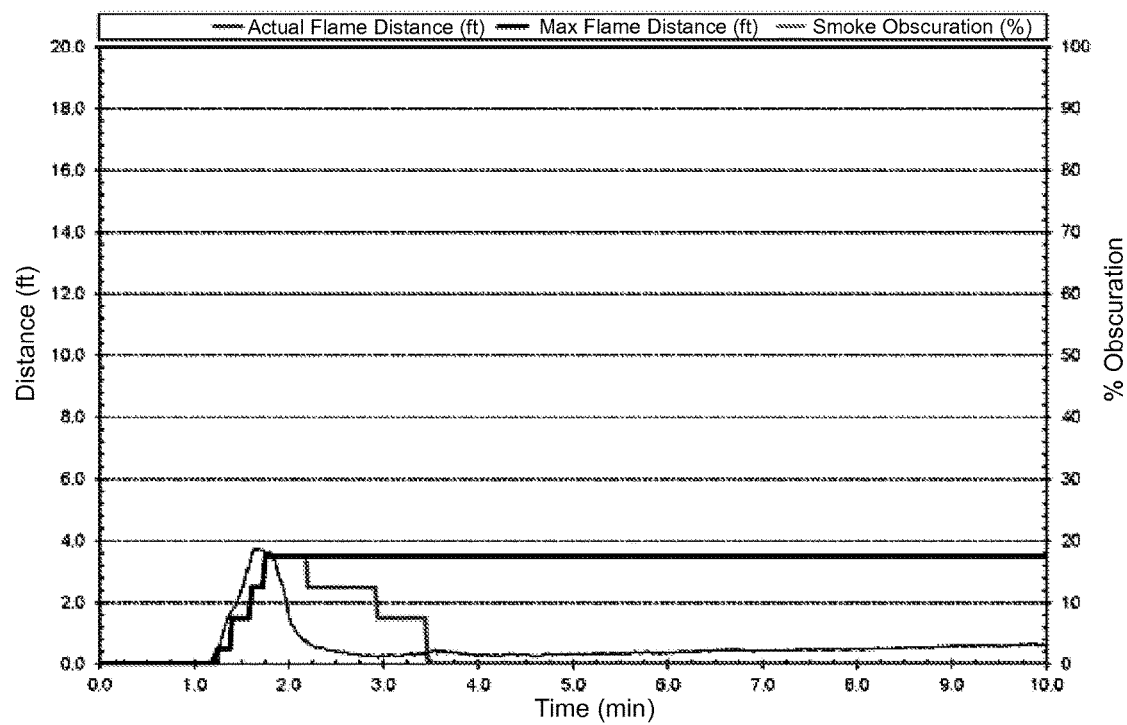
FIG. 17 is a graphical plot showing results of surface burning characteristics tests conducted on a second plurality of panel members, each panel member forming part of the access panel of FIG. 1.
Figure 18:
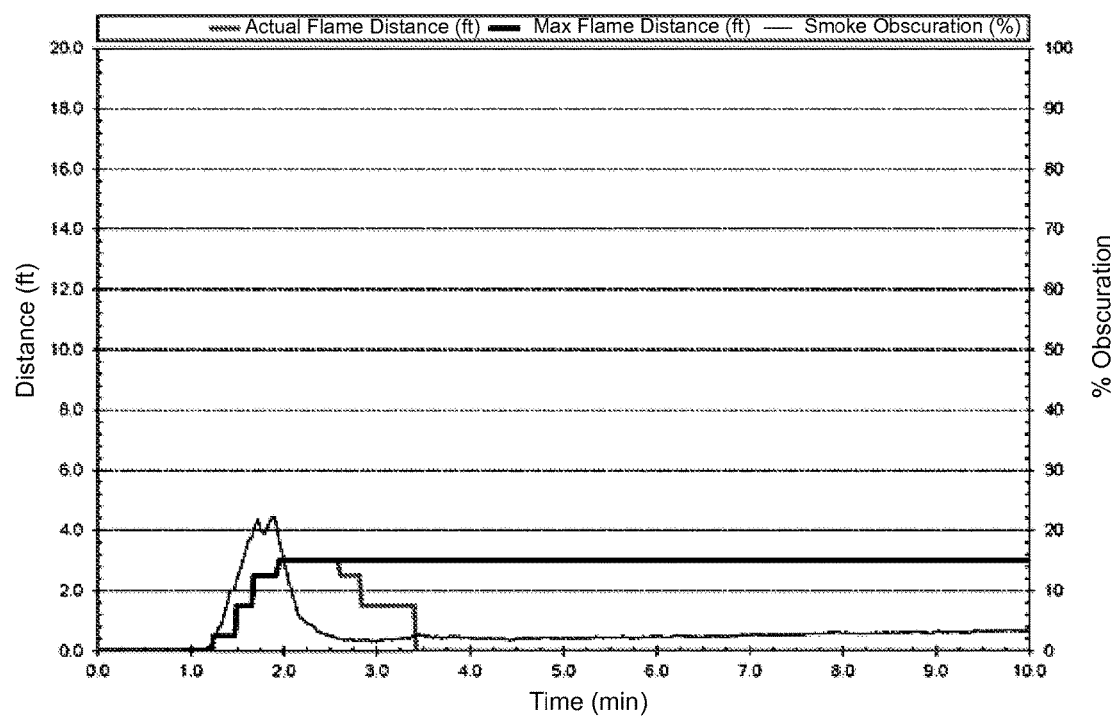
FIG. 18 is a graphical plot showing results of surface burning characteristics tests conducted on a third plurality of panel members, each panel member forming part of the access panel of FIG. 1.

Graphical plots showing the flame spread and light transmission of each of samples A, B and C are shown in FIGS. 16, 17 and 18, respectively.

The surface burning characteristics of Test Samples A to C warrants an assignment of a rating or classification shown in TABLE 2, as compared to untreated red oak (as 100) and inorganic reinforced cement board (0).

TABLE 2

| Material Details | Flame Spread Rating (FSR) | Smoke Developed Classification (SDC) |
|---|---|---|
| panel members | 15 | 15 |

For comparative purposes, the surface burning characteristics of various polymers subjected to surface burning characteristics tests conducted in accordance with the Standard CAN/ULC-S102-10 warrant an assignment of a rating or classification shown in TABLE 3. Therefore, these polymers are extremely combustible.

TABLE 3

| Material Details | Flame Spread Rating (FSR) | Smoke Developed Classification (SDC) |
|---|---|---|
| polystyrene (expanded foam board) | 200 | 500 |
| polypropylene copolymer (part for pipe support) | 155 | 500 |
| acrylic (cast sheet) | 100 | 435 |
| melamine (panel) | 135 | 305 |

Although embodiments have been described above with reference to the accompanying drawings, those of skill in the art will appreciate that variations and modifications may be made without departing from the spirit and scope thereof as defined by the appended claims.

What is claimed is:

1. A frameless access panel fabricated of metal, the panel comprising:
   a panel member comprising a single planar metal sheet having an inner surface and an outer surface and being sized to cover an opening, the planar metal sheet having a plurality of folded edges, the folded edges defining a contact surface of the panel member;
   at least one fixed projection fabricated of metal and fastened to the inner surface of the planar metal sheet and being spaced from a first edge of the panel member;
   at least one non-combustible, metal moveable member configured to slide along a respective track adjacent the inner surface of the planar metal sheet between a first position and a second position, the first position being spaced from a second edge of the panel member, the second edge being opposite the first edge, and the second position being spaced further from the second edge than the first position, the moveable member comprising a tab extending outwardly therefrom; and
   a respective biasing member providing a force for biasing the at least one moveable member towards the first position,
   wherein the entirety of each of the panel member, the at least one fixed projection, the at least one moveable member, and the biasing member, is fabricated of metal, and
   wherein the at least one fixed projection comprises a pin having a generally constant diameter along its length, the pin being directly fastened to said single planar metal sheet and extending therefrom,
   the frameless access panel being generally non-combustible.

2. The frameless access panel according to claim 1, wherein the biasing member is a coil spring.

3. The frameless access panel according to claim 1, wherein the access panel comprises a single moveable member.

4. The frameless access panel according to claim 1, wherein the access panel comprises two moveable members.

5. The frameless access panel according to claim 1, wherein said at least one moveable member comprises a number of moveable members, said number depending on one or both of the weight and the size of the access panel.

6. The frameless access panel according to claim 1, wherein the panel member is generally square in shape.

7. The frameless access panel according to claim 1, wherein the FSR of the access panel is from 0 to about 30.

8. The frameless access panel according to claim 1, wherein the SDC of the access panel is from 0 to about 30.

9. The frameless access panel of claim 1, wherein the pin has a gripping surface along its length for gripping a side of the opening to be covered by the single planar metal sheet.

10. A frameless access panel fabricated of metal, the panel comprising:
    a panel member comprising a single planar metal sheet having an inner surface and an outer surface and being sized to cover an opening, the planar metal sheet having a plurality of folded edges, the folded edges defining a contact surface of the panel member;
    at least one fixed projection fabricated of metal and fastened to the inner surface of the planar metal sheet and being spaced from a first edge of the panel member;
    at least one non-combustible, metal moveable member configured to slide along a respective track adjacent the inner surface of the planar metal sheet between a first position and a second position, the first position being spaced from a second edge of the panel member, the second edge being opposite the first edge, and the second position being spaced further from the second edge than the first position, the moveable member comprising a tab extending outwardly therefrom; and
    a respective biasing member providing a force for biasing the at least one moveable member towards the first position, wherein the entirety of each of the panel member, the at least one fixed projection, the at least one moveable member, and the biasing member, is fabricated of metal, and wherein the at least one fixed projection comprises a pin having a generally constant diameter along its length, the pin being fastened to said single planar metal sheet and extending substantially perpendicularly therefrom, the frameless access panel being generally non-combustible.

11. The frameless access panel according to claim 10, wherein the biasing member is a coil spring.

12. The frameless access panel according to claim 10, wherein the access panel comprises a single moveable member.

13. The frameless access panel according to claim 10, wherein the access panel comprises two moveable members.

14. The frameless access panel according to claim 10, wherein said at least one moveable member comprises a number of moveable members, said number depending on one or both of the weight and the size of the access panel.

15. The frameless access panel according to claim 10, wherein the panel member is generally square in shape.

16. The frameless access panel according to claim 10, wherein the FSR of the access panel is from 0 to about 30.

17. The frameless access panel according to claim 10, wherein the SDC of the access panel is from 0 to about 30.

18. The frameless access panel of claim 10, wherein the pin has a gripping surface along its length for gripping a side of the opening to be covered by the single planar metal sheet.

* * * * *